Dec. 10, 1968    J. J. KINDELAN    3,415,158
MOLD BLANK CENTERING AND CLAMPING DEVICE
Filed April 12, 1966
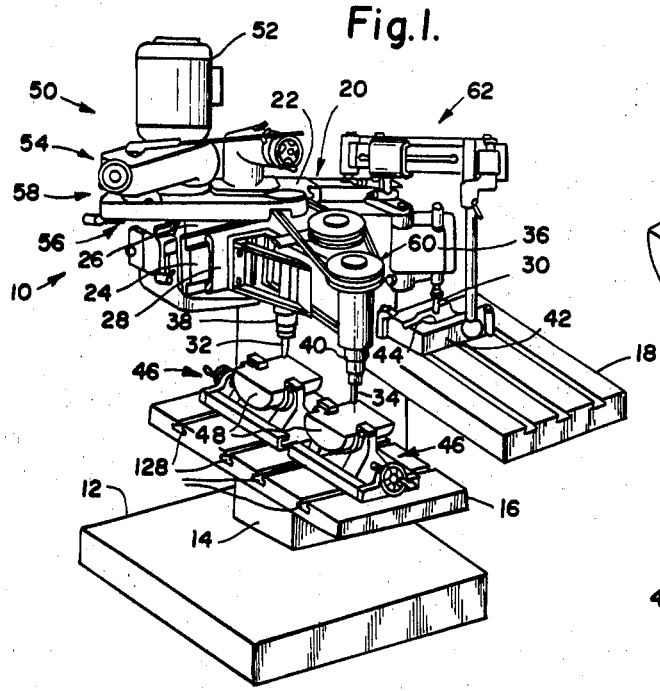
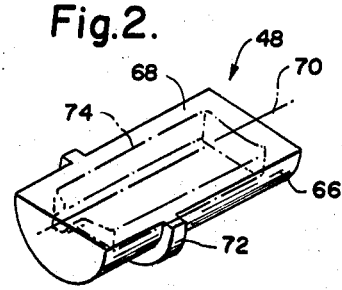
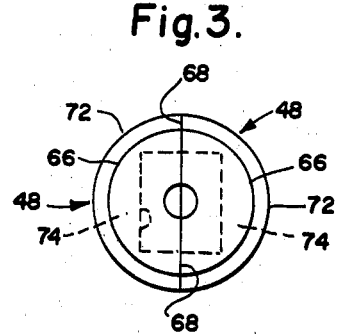
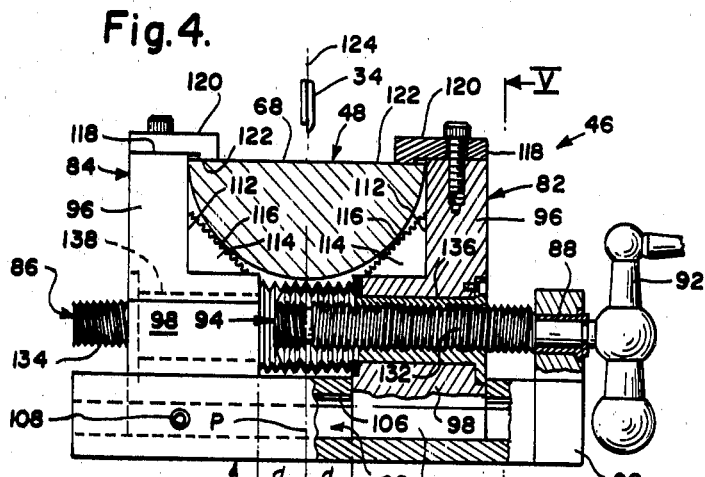
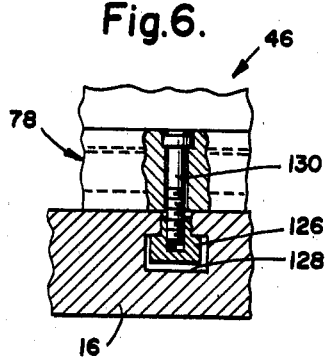
INVENTOR.
JAMES J. KINDELAN
BY
ATTORNEY 3,415,158
MOLD BLANK CENTERING AND
CLAMPING DEVICE
James J. Kindelan, Greensburg, Pa., assignor to Overmyer Mould Company of Pennsylvania, Greensburg, Pa., a corporation of Pennsylvania
Filed Apr. 12, 1966, Ser. No. 542,148
4 Claims. (Cl. 90—13.1)

ABSTRACT OF THE DISCLOSURE

This invention relates to workpiece centering and clamp-in devices, and more particularly to a mold blank centering and clamping device for use in conjunction with die sinking apparatus.

---

As is known, die sinking apparatus is used to produce die molds. The apparatus includes at least one cutter and a tracing stylus both of which are supported on a slide plate which in turn, is supported for movement in three-dimensional space. A master mold is secured to a clamping table which is disposed beneath the tracing stylus. A mold blank is secured to a second clamping table which is disposed beneath the cutter. The master mold and the mold blank are positioned relative to one another such that the cutter and the stylus will contact corresponding points on the mold blank and the master mold. The cutter is rotated at a relatively high rate of speed whereby as the tracing stylus is moved along the contours of the master mold, the cutter will machine contours into the mold blank which are identical to the contours of the master mold.

As is known, these die molds are used in the manufacture of, for example, glassware formed from glass, plastics and the like. These die molds normally are manufactured in two halves, the mold halves being subsequently clamped together to define a cavity having the desired shape and/or design of the article to be produced. The mold cavity is machined at a preselected location in each die mold, the arrangement being such that when two die molds are clamped together, the surface of the cavity is continuous throughout. If one cavity half is offset from the preselected location, the resulting cavity will have a discontinuous surface, that is, there will be a break in the continuity of the cavity surface at the line of juncture of the two mold halves.

Heretofore great care has been taken in aligning each mold blank with respect to the master mold. For example, a mold blank clamping device is used which, in reality, comprises a modified form of a conventional vise. That is, the clamping device includes a stationary jaw and a movable jaw. The movable jaw is moved away from the stationary jaw so as to accept a mold blank and thereafter is moved toward the stationary jaw to clamp the mold blank therebetween.

Initially, a first mold blank of a plurality of mold blanks is clamped in the clamping device. The clamping device and the mold blank are carefully positioned with respect to the master mold and the cutter so that the subsequently machined mold cavity is symmetrical about the centerline of the mold blank. In theory, it would appear as though a symmetrical mold cavity may be machined into each of a plurality of mold blanks, simply by sequentially clamping each mold blank and then proceeding with the machining operation.

However, when using the above-described clamping device, the resulting mold cavities are not symmetrical about the centerlines of the mold blanks. The reason why the mold cavities are not so disposed is that the outer diameters of the individual mold blanks are not identical. It should be evident that small variations in the outer diameter will, in effect, shift the position of the true mold blank centerline away from the desired position of the centerline relative to the clamping device. For example, if the outer diameter of a subsequent mold blank is less than the outer diameter of the initial mold blank, the centerline of the subsequent mold blank will be displaced toward the stationary jaw. Conversely, if the outer diameter of a subsequent mold blank is greater than the outer diameter of the initial mold blank, the centerline of the subsequent mold blank will be shifted away from the stationary jaw.

Many glasses, bottles, and the like, have configurations which are symmetrical about a longitudinal centerline, and consequently, the mold cavities for producing these wares, are machined symmetrically about the centerline of the mold blank. However, there are other wares whose configuration is not symmetrical about a longitudinal centerline. In this instance, it is desired that the mold cavity for producing such wares, be machined at an "exact location" in the mold blank. It should be evident that variations in the outer diameter of the mold blanks will likewise cause a shift in the desired "exact location" if the above-described clamping device is employed. The shift in the desired "exact location" will result in mismatches between two mold blanks.

Consequently, when using the above-described clamping apparatus, it is very difficult to produce a pair of mold halves which when clamped together will define a cavity having a continuous surface. The position of each new mold blank must be carefully checked and adjusted relative to the cutter and the master mold.

Accordingly, as an overall object, the present invention seeks to provide a clamping device for clamping mold blanks so that mold cavities may be machined therein in substantially the same location in each mold blank of a plurality of mold blanks.

Another object of the invention is to provide a mold blank clamping device wherein variations in the outer diameter of the mold blanks does not affect the positioning of the mold blanks by the clamping apparatus with respect to the cutter and the master mold.

Another object of the invention is to provide a clamping device employing a threaded shaft and having novel means for preventing the deposition of metal cuttings on the threaded portions of said shaft.

Although not limited thereto, the clamping device of the invention is particularly adapted for use with die sinking apparatus of the type having at least one driven cutter disposed above a clamping table and which is supported for movement in three-dimensional space in accordance with the contours of a master mold.

In accordance with the present invention, a clamping device is provided having a pair of jaw members which are engaged in a guideway provided in a base. The clamping device further includes means extending parallel to the base for moving both jaw members simultaneously either away from each other or toward each other as desired. At any particular position of the jaw members within the guideway, the jaw members are spaced from an imaginary centerline of the base, by the same distance. Consequently, once the clamping device has been carefully positioned relative to the cutter and the master mold, each mold blank will be clamped in the same position relative to the cutter and the master mold. Exact positioning of the mold blank is achieved despite variations in the outer diameters of the mold blanks.

The above and other objects and advantages of the present invention will become apparent from the following detailed description by reference to the accompanying drawings, in which:

FIGURE 1 is an isometric view of a conventional die sinking apparatus provided with the clamping device of the invention;

FIG. 2 is an isometric view of a mold blank;

FIG. 3 is a plan view of a pair of mold halves which have been assembled to form a mold cavity;

FIG. 4 is a side view, with portions in cross section, of the clamping device of the invention;

FIG. 5 is a cross-sectional view taken substantially along the line V—V of FIG. 4; and FIG. 6 is a fragmentary side view, partially in cross section, illustrating the manner in which the clamping device is secured to the clamping table of the die sinking apparatus of FIG. 1.

*Die sinking apparatus*

Reference is now directed to FIG. 1 wherein there is illustrated a conventional die sinking apparatus indicated generally by the numeral 10. As can be seen, the die sinking apparatus 10 includes a base 12 above which projects a support column 14. Projecting horizontally from and individually connected to the support column 14 are two clamping tables 16 and 18. Suitable controls (not shown) normally are provided for adjusting the position of the clamping tables 16 and 18.

Supported by the column 14 is a parallel guiding mechanism 20 comprising, in part, a back plate 22 which is connected to a front plate 24 by means of two spaced parallel arms 26, only one visible, the arrangement being such that the front plate 24 is maintained parallel to the back plate 22 at all times during its movement. The back plate 22 is connected to the vertical column 14 by means of a vertical guideway (not visible) whereby the entire parallel guiding mechanism may be raised or lowered. A slide plate 28 is connected to the front plate 24 for sliding movement longitudinally thereof and, therefore, parallel to the plane of the clamping tables 16, 18. The overall arrangement is such that the slide plate 28 is supported for movement in three-dimensional space. This is made possible, of course, by the parallel guiding mechanism 20, the vertical guideway which permits raising and lowering of the parallel guiding mechanism 20 and the sliding connection between the slide plate 28 and the front plate 24.

A tracing stylus 30 is supported on one end of the slide plate 28 while first and second cutters 32, 24 are supported at the opposite end of the slide plate 28. The tracing stylus 30 is rigidly secured to a support arm 36 which is pivotally connected to the slide plate 28. The first and second cutters 32, 34 are supported in spindles 38, 40 for rotation about vertical axes. The spindles 38, 40 are supported on the slide plate 28 and are each adjustable in a vertical direction whereby their height above the clamping table 16 may be adjusted. As can be seen, the tracing stylus 30 and the first and second cutters 32, 34 are supported in spaced-apart, substantially parallel relation and therefore movement of the tracing stylus 30 along a predetermined path will result in the movement of the first and second cutters 32, 34 along an identical predetermined path.

A master mold 42 is secured to the clamping table 18 beneath the tracing stylus 30. The master mold 42 has a cavity 4 formed therein which comprises one-half of the mold to be reproduced.

Secured to the clamping table 16 are two clamping devices 46 of the invention. Each of the clamping devices 46 clamps a mold blank 48 and positions the same directly beneath the first and second cutters 32, 34. The clamping devices 46 support the mold blanks 48 in a predetermined position relative to the master mold 42 whereby the tracing stylus 30 and the first and second cutters 32, 34 will contact corresponding points on the upper surfaces of the master mold 42 and the mold blanks 48.

The first cutter 32 is rotated by means of a drive means 50 which comprises an electric motor 52 carried on the support column 14. The electric motor 52 is connected to the first cutter 32 by means of a pair of sheave and belt assemblies 54, 56 whose adjacent ends are connected by means of a pivotal connection 58. The pivotal connection 58 permits the slide plate 28 to be moved freely along a predetermined path while the first cutter 32 is being driven. The second cutter 34 is driven by a third sheave and belt assembly 60 which receives its power from the sheave and belt assemblies 56.

The die sinking apparatus 10 is also provided with a pantograph assembly 62 having one end connected to the vertical support column 14 and its other end connected to the slide plate 28. The pantograph assembly 62 serves as a guiding system for the slide plate 28. The pantograph assembly 62 is of the adjustable type whereby, for example, the cavity 44 of the master mold 42 may be reproduced in the mold blanks 48 at the same scale, on an enlarged scale or at a reduced scale.

For a more detailed description of the construction and operation of the various components of the die sinking apparatus 10, reference is directed to copending application Ser. No. 388,881, filed Aug. 11, 1964, now U.S. Patent No. 3,249,016, and assigned to the assignee of the present invention.

*Conventional mold blank*

Referring now to FIG. 2, there is illustrated one of the conventional mold blanks 48 which has a generally semicylindrical body 66 including an upper surface 68. The semicylindrical body 66 has a longitudinal centerline indicated by the dash-dot line 70. As is conventional, the semicylindrical body 66 is provided with a radial flange 72 which is positioned at a predetermined position along the length of the body 66.

The mold blank 48 will be placed in the clamping devices 46 and a mold cavity, indicated by the dash-dot outline 74, will be machined therein. The mold cavity 74 will correspond to the mold cavity 44 of the master mold 42. When two of the mold blanks 48 have been machined, the mold blanks 48 will be positioned, as shown in FIG. 3, such that the upper faces 68 are butted. The radial flanges 72 of the molds 48 serve to align the molds 48 longitudinally of one another such that the peripheral edge of one of the mold cavities 74 will be in exact registry with the peripheral edge of the other mold cavity 74. Consequently, the radial flanges 72 have two functions when used in conjunction with the present clamping device 46. As will be described, the radial flanges 72 of the mold blanks 48 will engage certain portions of the clamping devices 46 so that the mold blanks will be positioned in one direciton relative to the cutters 32, 34. The second function of the radial flanges 72 is, of course, to align the mold cavities 74 as described above.

*Clamping device 46*

Referring now to FIGS. 4 and 5, the clamping device 46 comprises, in general, a base 78 having a guideway 80 formed therein, in which a pair of jaw members 82, 84 are engaged. A threaded shaft 86 extends through both of the jaw members 82, 84 and has one end rotatably supported in journal means, such as a brass bushing 88, carried by a support block 90. A handle 92 is used to rotate the shaft 86. A collapsible seal member 94 surrounds the intermediate portion of the shaft 86 and has each end connected to one of the jaw members 82, 84.

The jaw members 82, 84 are identical in construction and therefore, corresponding numerals will be employed to identify corresponding parts. The jaw members 82, 84 have an upper portion 96 and an outwardly flared lower portion 98 which terminates along each side in a lateral flange 100. The flanges 100 are engaged in longitudinal grooves 102 formed in the base 78 and comprises portions of the guideway 80. Gibs 104, 106 engaging a side and a top of the flanges 100, are clamped by gib locks 108, 110, respectively, to secure the jaw members 82, 84 in any desired position along the guideway 80.

As can best be seen in FIG. 4, the inner part of the upper portion 96 has been cut away to provide an L-shaped recess 112 in which the jaw plates 114 are detachably secured. The jaw plates 114 are preferably provided with a serrated outer face 116 to insure good gripping action. It will, of course, be evident that the configuration of the jaw plates 114 may be modified to conform to the configuration of the mold blank being gripped. As illustrated in FIG. 4, the outer face 116 of the jaw plates 114 are inclined at an angle of 45° with the horizontal so as to be able to center as well as clamp the mold blank 48 which has a semicylindrical body. It should be evident that the inclination of the outer faces 116 may be made to suit requirements.

The upper portion 96 has an upper surface 118 to which is secured a clamping member 120 having a lower face 122 engaged with the upper face 68 of the mold blank 48. The upper surface 118 and the lower face 122 are substantially parallel with the central axis of the shaft 86. Consequently, the serrated faces 116 of the jaw plates 114 and the lower faces 122 of the clamping plates 120 cooperate to clamp the mold blank 48 in a position wherein the upper surface 68 of the mold blank 48 resides in a plane which is substantially perpendicular to the vertical rotational axis, indicated by the dash-dot line 124, of the cutter 34, for example.

In FIG. 4, a vertical plane is indicated by a dash-dot line P. The vertical plane P extends transversely of the base 78 and intersects the center of the shaft 86. As is conventional, the clamping devices 46 are detachably secured to the clamping table 16 by means of T-bars 126 (FIG. 6) which reside in grooves 128 provided in the clamping table 16. A cap screw 130 extends through the base 78 into the T-bar 126, the arrangement being such that rotation of the cap screw 130, in the appropriate direction, will draw the T-bar toward the base 78 and thereby clamp the base 78 to the clamping table 16. The clamping devices 46 will be exactly aligned one with the other by adjusting their position in the grooves 128. Thereafter, the aforementioned control elements (not shown) will be employed to adjust the position of the clamping table 16 such that the rotational axes of the cutters 32, 34 are coincident with the vertical planes P of the clamping devices 46 and such that the stylus 30 and the cutters 32, 34 will contact corresponding points on the master mold 42 and the mold blanks 48.

As stated earlier, the clamping device 46 is provided with means for moving the jaw members 82, 84 simultaneously either toward each other or away from each other. This action is very important since it insures that all mold cavities will be machined in the exact same location in all subsequent mold banks.

Referring now to FIG. 4, the shaft 86 is provided with right-hand threads 132 on the right half portion thereof and left-hand threads 134 on the left half portion thereof. An internally threaded insert 136 is secured to the jaw member 82 and is threadedly engaged with the right-hand threads 132 of the shaft 86. An internally threaded insert 138 is secured to the jaw member 84 and is threadedly engaged with the left-hand threads 134 of the shaft 86. As shown in FIG. 4, the jaw members 82, 84 are spaced apart from the vertical plane P by exactly the same distance, the distance being indicated by the dimension line labeled d. Inasmuch as the threads 132, 134 are oppositely acting, rotation of the shaft 86 in one direction will cause the jaw members 82, 84 to recede from the vertical plane P at the same rate at any instant of time. Conversely, rotation of the shaft 86 in the opposite direction will cause the jaw members 82, 84 to approach the vertical plane P at the same rate at any instant of time. Consequently, the jaw members 82, 84 will be spaced apart from the vertical plane P by exactly the same distance regardless of their position within the guideway 80.

As shown in FIG. 4, the mold blank 48 is clamped between the serrated surfaces 116 of the jaw plates 114 and the lower faces 122 of the slamping members 120. As the jaw members 82, 84 are caused to recede from one another, the inclined serrated surfaces 116 of the clamping plates 114 will likewise recede from the mold blank 48 thereby causing the mold blank 48 to be lowered whereby the mold blank 48 is released from the gripping action of the jaw members 82, 84. Conversely, when a mold blank 48 is placed between the jaw members 82, 84 it will rest on the serrated surfaces 116 and have its upper surface 68 inclined with respect to the rotational axis 124 of the cutter 34. As the jaw members 82, 84 approach one another, the mold blank 48 will be raised by the approaching inclined serrated surfaces 116 until such time as the lower surfaces 122 of the clamping members 120 engage the upper surface 68 of the mold blank 48. At this time, the upper surface 68 will be perpendicular to the rotational axis 124 of the cutter 34.

It is important to note at this time that the outer diameter of the mold blank 48 may be slightly larger or slightly less than the outer diameter of the initial mold blank used to set up the clamping devices 46. Inasmuch as the jaw members 82, 84 approach the vertical plane P at the same rate at any instant of time, subsequent mold blanks 48, regardless of their outer diameter, will be clamped between the jaw members 82, 84 in a position wherein the upper surface 68 thereof will be perpendicular to the rotational axis 124 of the cutter 34. Furthermore, despite variations in the outer diameters of subsequent mold blanks 48, the cutter 34 will always contact the same point on the upper surface 68. The cutters 32, 34 will, for example, contact identical points on the centerline 70 (FIG. 2) of the mold blank 48. As should be evident, all subsequent mold blanks 48 will have a cavity 74 (FIG. 2) cut therein which is in exactly the same position or location.

To further aid in positioning each of the mold blanks 48, each of the jaw members 82, 84 is provided with a vertical side face 140, see FIG. 5, which is engaged by the radial flange 72 of the mold blank 48. Inasmuch as the radial flange 72 is provided at a predetermined location along the length of each of the mold blanks 48, engagement of the radial flange 72 with the vertical side face 140 serves to place all of the mold blanks 48 in exactly the same position with respect to the direction in which the plane P extends. On the other hand, the jaw members 82, 84 serve to place each of the mold blanks 48 in exactly the same position with respect to a direction which is perpendicular to the plane P. Consequently, with the cutter 34 (FIG. 4) in a given position, all mold blanks will be clamped between the jaw members 82, 84 in an exact position whereby the cutter 34 will engage identical points on all of the mold blanks 48.

Referring still to FIG. 4, the seal member 94 protects the intermediate portions of the shaft 86, that is, that portion extending between the jaw members 82, 84. The seal member 94 has each of its ends secured to one of the jaw members 82, 84 by any suitable means. The seal member 94 preferably has a bellows configuration which facilitates its expansion and contraction with the movement of the jaw members 82, 84.

Although the invention has been shown with one specific embodiment, it will be readily apparent to those skilled in the art that various changes in form and arrangement of parts may be made to suit requirements without departing from the spirit and scope of the invention.

I claim as my invention:

1. Mold blank centering and clamping apparatus for use in conjunction with die sinking apparatus for cutting cavities in a mold blank of generally semicylindrical shape, said apparatus comprising, in combination, a pair of jaws, each of said jaws being movable in a common guideway and each jaw comprising both a jaw plate inclined at an angle with the horizontal and adapted to be brought into contact with the cylindrical exterior surface of said mold blank, and a clamping member having a lower face that is planar and extends substantially horizontal and is adapted to be brought into contact with the planar upper surface of said mold blank, and means for causing said jaws to be moved toward each other so as to force a mold blank contained therebetween into a position where it is located symmetrically between said jaws with its planar upper face being horizontal and in face-to-face contact with said clamping members.

2. The combination with copying cutter means comprising a clamping table, at least one cutter disposed above said table, means for supporting said cutter for movement in three-dimensional space in accordance with the contours of a master mold, and drive means for rotating said cutter, of apparatus as defined in claim 1.

3. Apparatus as defined in claim 1, characterized in that said means for causing said jaws to be moved toward each other comprises a shaft extending through both of said jaw members, said shaft having right-hand threads engaged with one jaw member and left-hand threads engaged with the other jaw member; and means for rotating said shaft whereby said jaw members are moved simultaneously away from each other and toward each other in accordance with the direction of rotation of said shaft.

4. The combination with copying cutter means comprising a clamping table, at least one cutter disposed above said table, means for supporting said cutter for movement in three-dimensional space in accordance with the contours of a master mold, and drive means for rotating said cutter, of apparatus as defined in claim 3.

References Cited
UNITED STATES PATENTS

| | | | |
|---|---|---|---|
| 718,035 | 1/1903 | Tindel | 90—60 |
| 1,197,286 | 9/1916 | Hannay | 77—63 |
| 1,406,901 | 2/1922 | Rocher | 77—63 |
| 1,511,298 | 10/1924 | Petzold | 90—60 |
| 2,660,933 | 12/1953 | Garing | 90—60 |
| 2,954,651 | 10/1960 | Gebhart | 269—285 |
| 3,001,422 | 9/1961 | Klancnik | 77—63 |
| 3,126,792 | 3/1964 | Zwick | 90—13.1 |

GERALD A. DOST, *Primary Examiner.*

U.S. Cl. X.R.

77—63; 269—285